(12) United States Patent
Kondareddy

(10) Patent No.: US 11,533,687 B2
(45) Date of Patent: Dec. 20, 2022

(54) DYNAMIC SWITCHING OF POWER LEVELS IN DEVICE HAVING DIFFERENT WIRELESS COMMUNICATION CIRCUITS

(71) Applicant: Cypress Semiconductor Corporation, San Jose, CA (US)

(72) Inventor: Raghunatha Kondareddy, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 51 days.

(21) Appl. No.: 17/032,380

(22) Filed: Sep. 25, 2020

(65) Prior Publication Data

US 2022/0104141 A1 Mar. 31, 2022

(51) Int. Cl.
| | |
|---|---|
| *H04W 52/20* | (2009.01) |
| *H04W 72/04* | (2009.01) |
| *H04W 52/26* | (2009.01) |
| *H04W 52/28* | (2009.01) |
| *H04L 1/00* | (2006.01) |
| *H04W 76/15* | (2018.01) |
| *H04W 52/22* | (2009.01) |
| *H04W 76/00* | (2018.01) |
| *H04W 88/06* | (2009.01) |
| *H04W 72/12* | (2009.01) |

(52) U.S. Cl.
CPC ........... *H04W 52/20* (2013.01); *H04L 1/0045* (2013.01); *H04L 1/0053* (2013.01); *H04W 52/225* (2013.01); *H04W 52/267* (2013.01); *H04W 52/288* (2013.01); *H04W 72/0453* (2013.01); *H04W 72/0473* (2013.01); *H04W 72/1215* (2013.01); *H04W 76/00* (2013.01); *H04W 76/15* (2018.02); *H04W 88/06* (2013.01)

(58) Field of Classification Search
CPC ... H04W 52/20; H04W 76/15; H04W 52/225; H04W 72/0453; H04W 72/0473; H04W 52/267; H04W 76/00; H04W 52/288; H04W 72/1215; H04W 88/06; H04L 1/0045; H04L 1/0053
See application file for complete search history.

(56) References Cited

U.S. PATENT DOCUMENTS

| | | | | |
|---|---|---|---|---|
| 5,905,372 | A * | 5/1999 | Kuffner | G06K 7/0008 323/356 |
| 7,061,468 | B2 * | 6/2006 | Tiphane | G06F 3/03543 345/158 |
| 7,912,443 | B2 * | 3/2011 | Rotzoll | H04W 52/0229 455/574 |

(Continued)

*Primary Examiner* — Dominic E Rego

(57) ABSTRACT

A method can include an integrated circuit device, determining if first communication circuits are operating in a first mode that wirelessly receives data at a first rate or a second mode that wirelessly receives data at a second rate that is lower than the first rate. If the first communication circuits are operating in the second mode, transmitting signals with the second communication circuits at a first power level, and if operating in the first mode, transmitting signals with the second communication circuits at a second power level that is lower than the first power level. In the first mode, X symbols per data bit are received and in the second mode, Y symbols per data bit are received, where X<Y. Corresponding devices and methods are also disclosed.

8 Claims, 11 Drawing Sheets

(56) References Cited

U.S. PATENT DOCUMENTS

| | | | | |
|---|---|---|---|---|
| 8,130,659 | B2* | 3/2012 | Gonikberg | H04L 1/0015 370/242 |
| 8,374,159 | B2* | 2/2013 | Roberts | H04W 48/14 455/525 |
| 8,934,515 | B2* | 1/2015 | Deltour | H04B 1/7156 375/132 |
| 9,641,248 | B1* | 5/2017 | Koehler | H04B 7/14 |
| 9,989,980 | B1* | 6/2018 | Urban | G03B 17/55 |
| 2007/0066329 | A1* | 3/2007 | Laroia | H04L 5/0053 455/502 |
| 2007/0285214 | A1* | 12/2007 | Rotzoll | H04W 52/0293 340/10.34 |
| 2008/0013466 | A1* | 1/2008 | Kowalewski | H04M 3/56 455/518 |
| 2008/0293363 | A1* | 11/2008 | Olgaard | H04B 17/29 455/67.7 |
| 2009/0045992 | A1* | 2/2009 | Tracht | H03H 17/0275 375/295 |
| 2014/0269223 | A1* | 9/2014 | Mokhnatkina | G04G 21/025 368/73 |
| 2015/0138391 | A1* | 5/2015 | Campbell | H04N 5/225 348/222.1 |
| 2016/0019663 | A1* | 1/2016 | Mani | G06Q 50/06 700/291 |
| 2016/0021613 | A1* | 1/2016 | Mani | G01D 4/002 370/311 |
| 2019/0304288 | A1* | 10/2019 | Amir | G08B 25/003 |
| 2019/0346904 | A1* | 11/2019 | Tannenberger | G06F 1/3225 |
| 2020/0103268 | A1* | 4/2020 | Grießaum | G01F 23/284 |
| 2020/0259725 | A1* | 8/2020 | Malakhova | H04L 43/024 |
| 2020/0393488 | A1* | 12/2020 | Kahn | G01C 22/00 |
| 2021/0194618 | A1* | 6/2021 | Gorday | H04L 1/1812 |

* cited by examiner

DYNAMIC SWITCHING OF POWER LEVELS IN DEVICE HAVING DIFFERENT WIRELESS COMMUNICATION CIRCUITS

TECHNICAL FIELD

The present disclosure relates generally to wireless systems, and more particularly to systems having devices with collocated communication circuits that can communicate according to different standards and/or protocols over a same medium.

BACKGROUND

A combination device can include wireless circuits that are compatible with different standards. One example of a conventional combination device is a device that includes circuits compatible with a Bluetooth (BT) standard as well as an IEEE 802.11 wireless standard (referred to herein as WiFi). In a conventional BT/WiFi combination device, communication circuits can share a same 2.4 GHz band. WiFi circuits can operate over channels of relatively large size (e.g., 20 MHz, 40 MHz). BT circuits can frequency hop between different relatively smaller channels, depending upon mode. In a standard (i.e., classic) BT mode, 1 MHz channels can be selected from 80 possible channels, while in a BT low energy (LE) mode, 2 MHz channels can be selected from 40 possible channels. BT LE can include a standard LE mode (referred to BT LE) as well as a long-range mode, also called "coded PHY" (referred to as BT LR).

The BT LR mode can extend an effective range of the BT radio circuits through redundancy in encoding. This can include using more symbols per data bit (e.g., 2 or 8), as well as encoding for forward error correction (FEC) by the receiving device. In the BT LR mode, a BT device can transmit at the same power level as BT LE, thus advantageously maintaining a relatively low amount of power consumption. However, a BT LR data transmission rate can be slower than that of a BT LE data transmission rate.

A drawback to conventional combination devices can be the necessity to share the same 2.4 GHz band. In a combination device, the different radio circuits (i.e., BT and WiFi) are space constrained, and their transmissions can interfere with one another. The operation of the different radio circuits at the same time can lead to higher packet error rates for both radio circuits. One conventional approach to addressing this issue can be to reduce the transmission power of the WiFi circuits. A drawback to this solution is the resulting reduction in range for WiFi connections.

Another example of a combination device can be a device having ultrawideband (UWB) communication circuits, which can operate in a wide range (e.g., 3.1 GHz to 10.6 GHz), and communication circuits that overlap the range (e.g., IEEE 802.11n operating in the 5 GHz ISM band). UWB communication circuits can include both low rate pulse (LRP) and high rate pulse (HRP) modes of operation.

It would be desirable to arrive at some way of improving the performance of a combination device that does suffer from the drawbacks of conventional solutions.

DETAILED DESCRIPTION

Figure 1A:
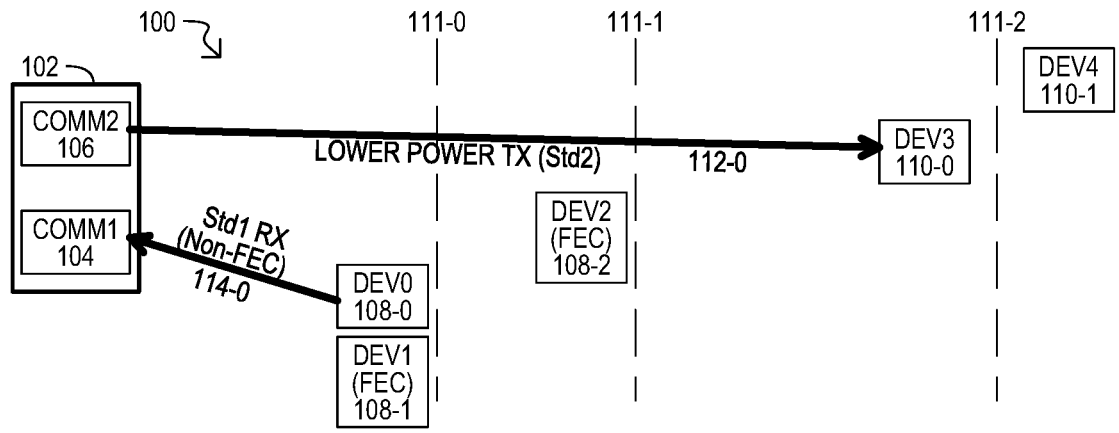
FIGS. 1A to 1C are a series of diagrams showing a system and corresponding operations according to embodiments.

According to embodiments, systems and devices can include different communication circuits, collocated on the same device, that share a wireless band. A first of the communication circuits can have a mode that increases a link reliability and/or range through encoding (e.g., uses more symbols per transmitted data bit and/or encodes for forward error correction (FEC)). When the first communication circuits are operating in the increased reliability mode, collocated second communication circuits can transmit at a higher power. When first communication circuits are not operating in the higher reliability/range mode, the second communication circuits can transmit at a lower power. In this way, the second communication circuits can dynamically vary transmit power based the operating mode of the collocated first communication circuits.

According to embodiments, if first communication circuits are operating in the higher reliability/range mode, a receive power for the first communication circuits can be lowered. If the first communication circuit are not operating in the higher reliability/range mode, a receive power can be increased. In this way, signal power to the first communication circuits can dynamically varied based on their mode of operation.

In some embodiments, the first communication circuits can be compatible with a Bluetooth standard, and the higher reliability/range mode can be a Bluetooth Low Energy coded PHY mode (i.e., BT long range (BT LR)). Second communication circuits can be compatible with an IEEE 802.11 wireless standard operating in the 2.4 GHz band.

In the various embodiments below, like items are referred to by the same reference characters, but with the leading digit(s) corresponding to the figure number.

Figure 1B:
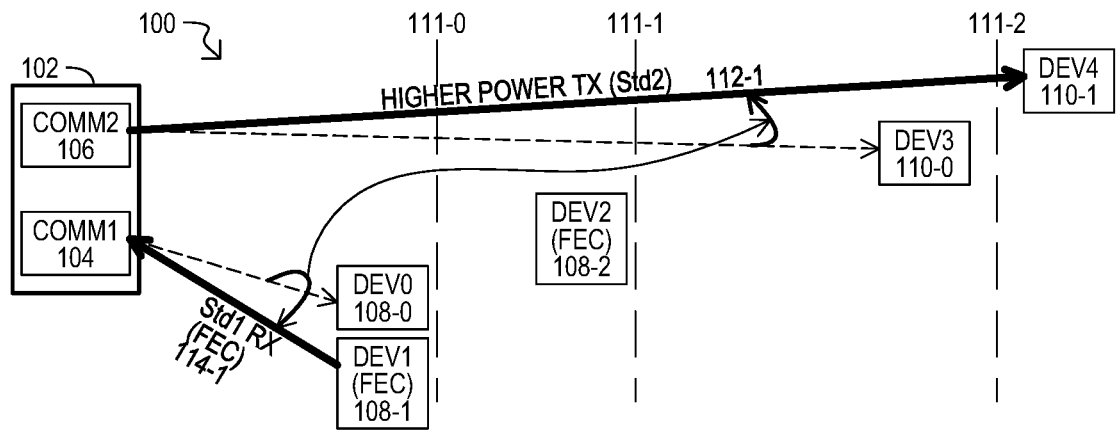
Figure 1C:
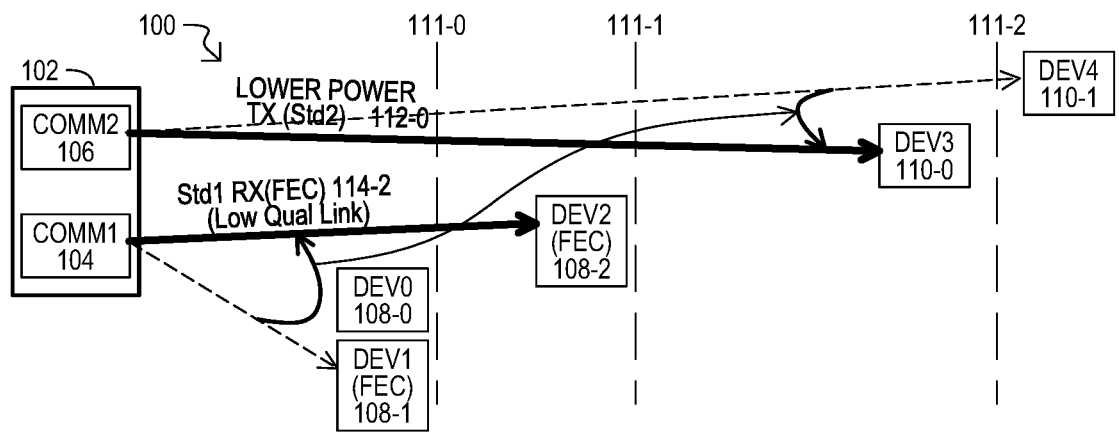

FIGS. 1A to 1C are diagrams showing a system 100 and corresponding operations according to embodiments. A system 100 can include a combination device 102, which can be in wireless communication with a number of first type devices (108-0 to -2) and second type devices 110-0/1. First type devices (108-0 to -2) can operate according to a first standard (Std1). Second type devices (108-0 to -2) can operate according to a second standard (Std2). A first standard Std1, can have a first mode Std1(non-FEC) and a second mode Std1(FEC). In mode Std1(FEC), data can be encoded for greater reliability and/or range. As but one example, data can be encoded for a forward error correction (FEC) algorithm executed by a receiving device. However, this should not be construed as limiting. Any suitable coding that improves reliability/range over the other mode Std1 (non-FEC) can be utilized. In the embodiment of FIGS. 1A to 1C, device 108-0 is configured to operate in in the Std1(non-FEC) mode and devices 108-1/2 are configured to operate in the Std1(FEC) mode.

Combination device 102 can include first communication circuits 104 and second communication circuits 106. First communication circuits 104 can operate according to Std1 and can establish links with first-type devices (108-0 to -2). Second communication circuits 106 can operate according to Std2 and can communicate with second type devices (110-0/1). Second communication circuits 106 can transmit data at two or more different power levels, including a lower transmission power level and a higher transmission power level.

FIGS. 1A to 1C show a number of effective range limits for transmissions from combination device 102. Limit 111-0 can be an effective range limit for reception or transmission by first communication circuits 104 in mode Std1(non-FEC). Limit 111-1 can be an effective range limit for transmission of mode Std1(FEC) for first communication circuits 104. Limit 111-2 can be an effective range limit for a transmission of according to Std2 by second communication circuits 112-0, at a lower transmission power level.

Operations of the system 100 will now be described.

Referring to FIG. 1A, first communication circuits 104 can be in communication with first type device 108-0, which can include transmissions according to the Std1(non-FEC) mode 114-0. To avoid disturbing communications 114-0 with first type device 108-0, second communication circuits 106 can transmit a lower power 112-0. In the embodiment shown, lower power transmissions 112-0 can adequately service second type device 110-0, but may not reach, or provide only reduced data rates to the other second type device 110-1 (as it is beyond effective range 111-2).

Referring to FIG. 1B, first communication circuits 104 can switch from communicating with first type device 108-0 in mode Std1(non-FEC) to first type device 108-1 in the more robust mode Std1(FEC). In response to such a change, second communication circuits 106 can switch to transmitting at a lower power level (e.g., 112-0) to transmitting at a higher power level 112-1. In the embodiment shown, higher power transmissions 112-1 can adequately service all second type devices of the system, including device 110-1 beyond range 111-2. Because first communication circuits 104 are operating in the Std1(FEC) mode, the connection will be robust enough to maintain performance despite any interference presented by higher power transmissions 112-1. In the event first communication circuits 104 switch back to the Std1(non-FEC) mode, second communication circuits 106 can return to transmitting at the lower power (e.g., 112-0). In this way, second communication circuits 106 can dynamically switch between lower and higher transmitting power based on the first communication circuits mode of operation.

In some embodiments, a combination device 102 can switch between lower and higher power transmissions based on both a mode of operation and the quality of the connection. An example of such an operation is shown in FIG. 1C.

Referring to FIG. 1C, first communication circuits 104 can switch from communicating with first type device 108-1, in the more robust mode Std1(FEC), to communicating with another first type device 108-2 in the same robust mode Std1(FEC). However, a connection with first type device 108-2 can be of lower quality than that of first type device 108-1. As but one example, first type device 108-2 can be beyond range limit 111-0. Consequently, higher power transmissions 112-1 by second communication circuits 106 can interfere with communications to first type device 108-2. Second communications circuit 106 can be aware of, or by notified by first communication circuits 104, that while transmissions are being made at a more robust mode (i.e., Std1(FEC)), the target device (i.e., 108-2) is not sufficiently in range. As a result, second communication circuits 106 can switch to a lower transmitting power 112-0, to thereby reduce any interference with the connection 114-2 to first type device 108-2. In the event first communication circuits 104 switch to another first type device communicating in same mode Std1(FEC) but with a higher quality connection (e.g., device 108-1), second communication circuits 106 can dynamically switch back to higher power transmissions (e.g., 112-1).

Figure 1D:
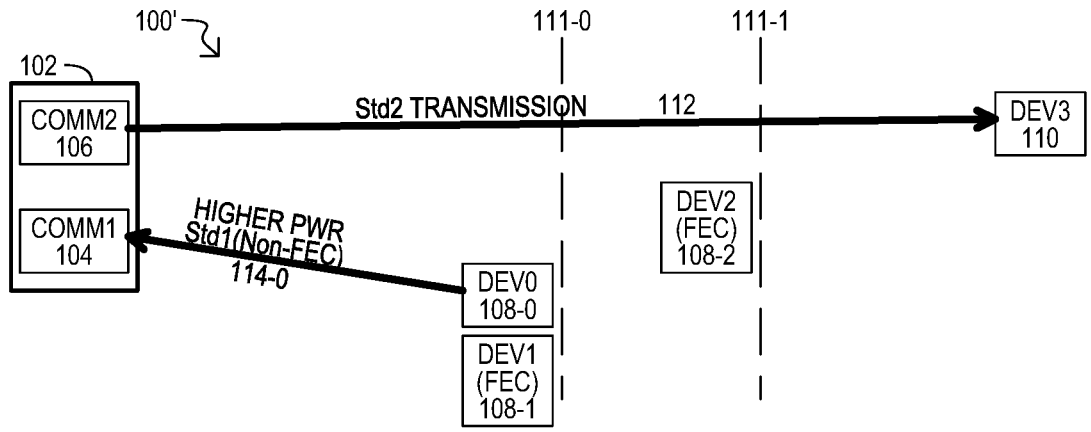
FIGS. 1D to 1F are a series of diagrams showing a system and corresponding operations according to additional embodiments.
Figure 1E:
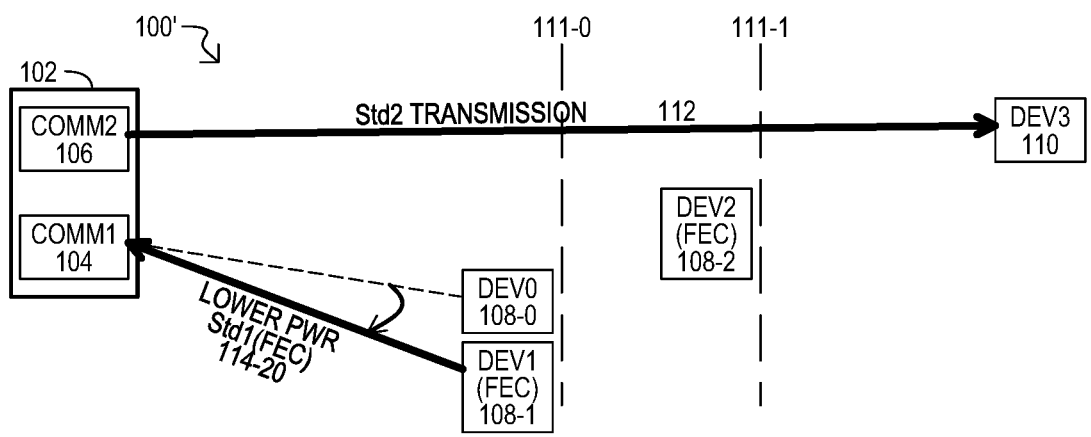
Figure 1F:
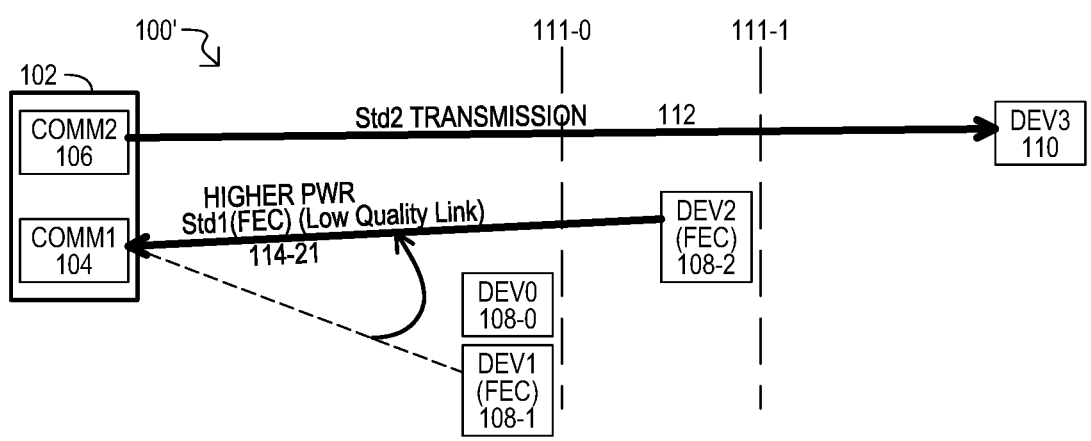

FIGS. 1D to 1F are diagrams showing a system 100' and corresponding operations according to additional embodiments. A system 100' can include items like those of FIGS. 1A to 1D, however, only one second type device 110 is shown, and range limit 111-2 is not shown. Combination device 102 can include first communication circuits 104 and second communication circuits 106. As in the case of FIGS. 1A to 1C, first communication circuits 104 can operate in the standard mode (i.e., Std1(non-FEC)) and the more robust mode (i.e., Std1(FEC)). Further, in mode Std1(FEC), first communication circuits 104 can receive data at two or more different power levels, including a lower reception power level 114-21 and a higher reception power level 114-20.

Operations of the system 100' will now be described.

Referring to FIG. 1D, first communication circuits 104 can be in communication with first type device 108-0 in the standard mode (i.e., Std1(non-FEC)). At the same time, second communication circuits 106 may be in communication with a second type device 110. To ensure performance of the link with first type device 108-0, first communication circuits 104 can receive data at the higher power level 114-0.

Referring to FIG. 1E, first communication circuits 104 can switch from communicating with first type device 108-0 in mode Std1(non-FEC) to first type device 108-1 in the more robust mode Std1(FEC). Because the link is now more robust, first communication circuits 104 can receive at a lower transmitting power 114-20. By doing so, performance of second communication circuits 112 can improve, as there can be less interference due to first communication circuit transmissions. Further, there can be additional power savings. In the event first communication circuits 104 switch back to the Std1(non-FEC) mode, signals to first communication circuits 104 can resume at a higher power level (e.g., 114-0).

In some embodiments, first communication circuits 104 of a combination device 102 can switch between lower and higher reception power based on the quality of the connection. Such an arrangement is shown in FIG. 1F.

Referring to FIG. 1F, first communication circuits 104 can switch from communicating with first type device 108-1 in the more robust mode Std1(FEC), to communicating with another first type device 108-2 in the same robust mode Std1(FEC). However, a connection with first type device 108-2 can be of lower quality than that of first type device 108-1. As a result, first circuits 104 can receive signals at a higher reception power level 114-21, to thereby ensure sufficient quality for the link with first type device 108-2. A higher receiving power level 114-21 can be the same as, or different than, receiving power 114-0 shown in FIG. 1D, but is understood to be higher than 114-20 shown in FIG. 1E. In the event first communication circuits 104 switch to another first type device communicating in same mode Std1(FEC) but with a higher quality connection (e.g., device 108-1), first communication circuits 104 can dynamically switch back to lower power reception (e.g., 114-20).

It is understood that in some embodiments, a system can include the dynamic transmit power operations of both FIGS. 1A to 1C and FIGS. 1D to 1F.

While embodiments can include systems with combination devices operating according to any suitable standards, some embodiments can include systems operating according to a first standard that frequency hops between multiple first channels, and a second standard that transmits across a second channel that overlaps multiple first channels. FIGS. 2A to 2D show examples of such embodiments.

Figure 2A:
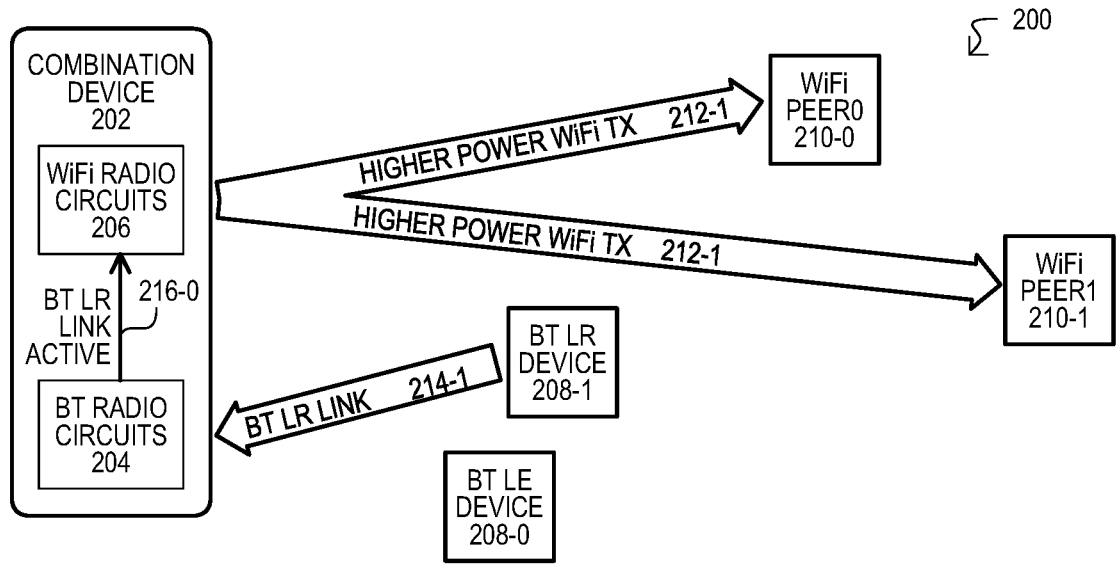
FIGS. 2A and 2B are diagrams showing a system with a Bluetooth (BT) — IEEE 802.11 wireless (WiFi) combination device and operations according to embodiments.
Figure 2B:
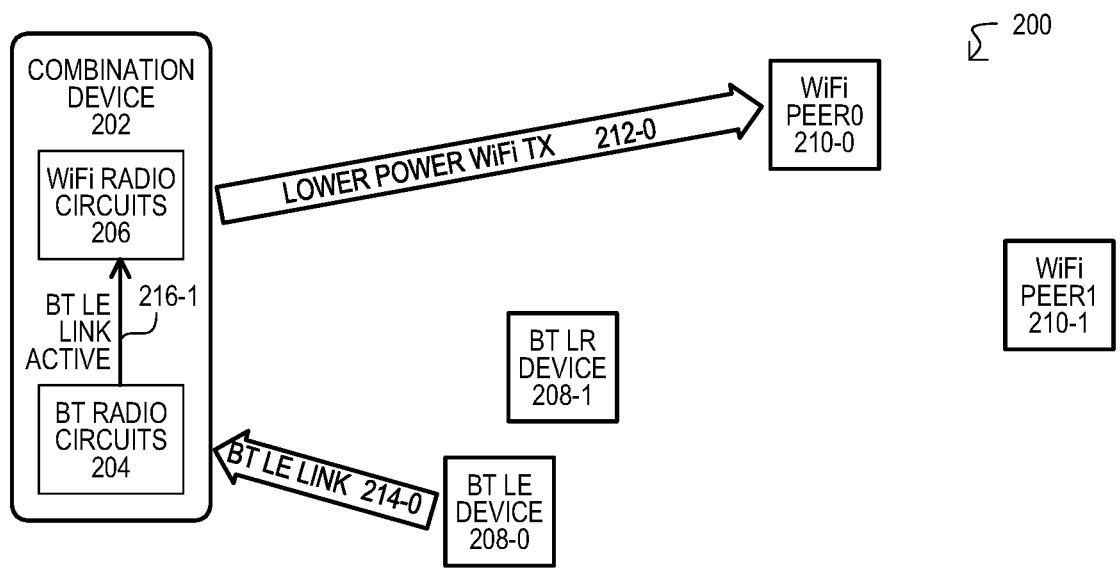

FIGS. 2A and 2B are diagrams showing a system 200 that includes a BT-WiFi combination device 202, a BT device 208-0 configured to operate in a BT low energy mode (BT LE), a BT device 208-1 configured to operate in a BT low energy coded PHY mode (BT LR), a first WiFi (peer) device 210-0, and a second WiFi (peer) device 210-1.

Combination device 202 can include BT radio circuits 204 and WiFi radio circuits 206. BT radio circuits 204 can establish a BT LE link with BT device 208-0 and a BT LR link with BT device 208-1. Further, BT radio circuits 204 can generate status information indicating its current mode of operation (e.g., BT classic, BT LE, BT LR). Such status information can be communicated to, or make available for, WiFi circuits 206. Based on the status information, WiFi radio circuits 206 can vary a WiFi transmit power when communicating with its peers 210-0/1.

Operations of the system 200 will now be described.

Referring to FIG. 2A, BT radio circuits 204 can communicate with BT device 208-1 over a BT LR link 214-1. Due to its redundancy, a BT LR link 214-1 can be more reliable, and more resistant to interference from WiFi transmissions. The presence and/or activity of the BT LR link can be communicated to WiFi radio circuits 206 as status information 216-0. As but only two of many possible examples, such status data can be read from BT radio circuits 204 by WiFi radio circuits 206 (e.g., a register or memory read) or transferred to WiFi radio circuits 206 by BT radio circuits 204 (e.g., a register or memory write, a signal activation, etc.). In response to such status information, if not already doing so, WiFi radio circuits 206 can transmit at a higher power level 212-1. In the embodiment shown, a higher power level transmission 212-1 can reach both WiFi devices 210-0/1.

Referring to FIG. 2B, BT radio circuits 204 can switch to communicating with BT device 208-0 over a BT LE link 214-0. A BT LE link 214-0 can be more susceptible to interference than a BT LR link. The presence and/or activity of the BT LE link can be communicated to WiFi radio circuits 206 as status information 216-1. In response to such status information, WiFi radio circuits 206 can switch from the higher transmit power 212-1 to a lower transmit power 212-0, reducing possible interference with the BT LE link 214-0. In the embodiment shown, a lower power level transmission 212-0 can reach WiFi device 210-0, but may not reach, or may be too unreliable for, WiFi device 210-1. WiFi radio circuits 206 can dynamically switch between higher and lower power levels as BT radio circuits 204 switch between BT LE (or BT classic) links and BT LR links.

Figure 2C:
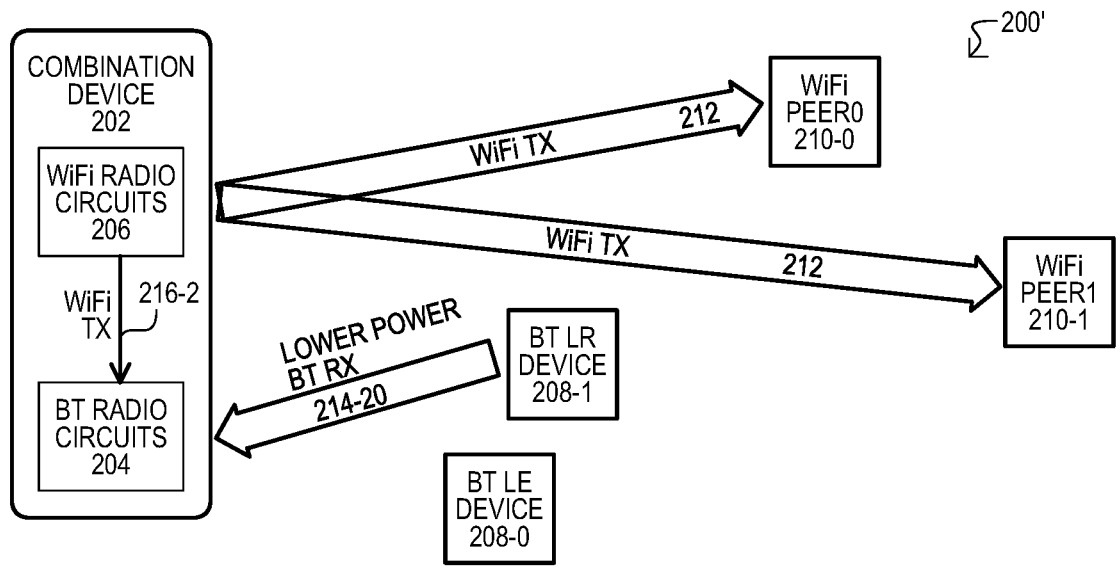
FIGS. 2C and 2D are diagrams showing another system with a BT-WiFi combination device and operations according to additional embodiments.
Figure 2D:
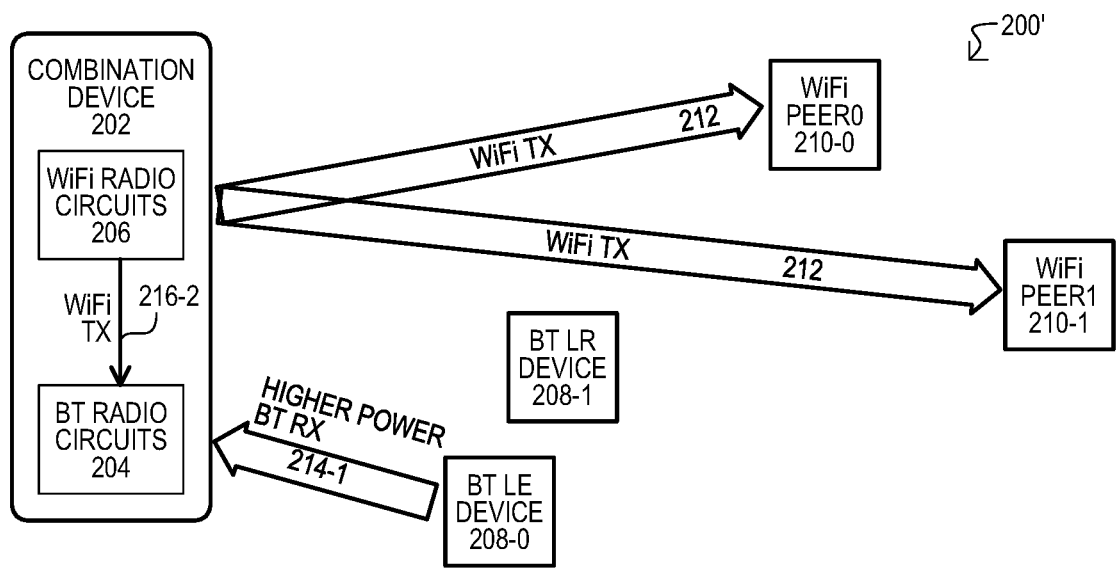

FIGS. 2C and 2D are diagrams showing a system 200' and corresponding operations according to additional embodiments. A system 200' can include a BT-WiFi combination device 202, as well as BT devices 208-0/1 and WiFi devices 210-0/1 as described for FIGS. 2A and 2B.

Combination device 202 can include BT radio circuits 204 and WiFi radio circuits 206. BT radio circuits 204 can establish links with BT devices 208 as described for FIGS. 2A and 2B. In addition, BT radio circuits 204 can transmit at two different power levels.

Operations of the system 200' will now be described.

Referring to FIG. 2C, BT radio circuits 204 can communicate with BT device 208-1 over a lower power BT LR link 214-20. That is, as BT radio circuits 204 receive data for link 214-20, such transmissions can be at a lower of at least two different transmit power levels. Due to its coded redundancy, a BT LR link 214-20 can be reliable, even at the lower power level. In addition, the BT LR link 214-20 can present less interference to any WiFi transmissions 212 (which can vary or not vary in power as described in FIGS. 2A and 2B). In some embodiments, BT radio circuits 204 can selectively transmit at the lower power level in response to activity by WiFi radio circuits 206. That is, in response to an indication 216-2 from WiFi radio circuits 206 signaling a WiFi transmission (e.g., current or pending), BT radio circuits 204 can switch from a higher transmission power level to a lower transmission power level.

Referring to FIG. 2D, BT radio circuits 204 can switch from communicating with BT device 208-1 to communicating with BT device 208-0, which can be configured for a BT LE link 214-1. Because a BT LE link 214-1 lacks coded redundancy, BT radio circuits 204 can receive data at a higher BT receive power to ensure link reliability. In this way, BT radio circuits 204 can dynamically receive data at higher and lower power levels as they switch between BT LE (or BT classic) links and BT LR links.

While FIGS. 2A to 2D show BT-WiFi combination devices, alternate embodiments can include any other suitable communication circuits. In one alternate embodiment, communication circuits can include ultrawideband (UWB) communication circuits (e.g., IEEE 802.15.4z standard) operating in a low rate pulse (LRP) mode or high rate pulse (HRP) mode. A transmission power of collocated communication circuits can vary a transmission power based on a mode of operation (HRP or LRP).

Figure 3:
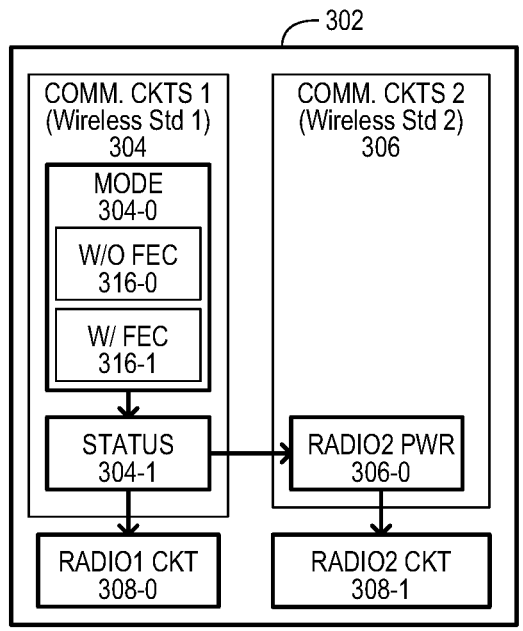
FIG. 3 is a block diagram of a combination device according to an embodiment.

FIG. 3 is a block diagram 302 of a combination device 302 according to an embodiment. A combination device 302 can include different communication circuits collocated in the same device. A combination device 302 can include first communication circuits 304, second communication circuits 306, first radio circuits 308-0, and second radio circuits 308-1.

First communication circuits 304 can be wireless communication circuits compatible with a first standard. First communication circuits 304 can include a mode control section 304-0 and a status section 304-1. A mode control section 304-0 can support at least two different modes of operation, including a mode that does not include FEC (W/O FEC) 316-0 and a mode that does include FEC (W/FEC) 316-1. In a W/FEC mode 316-1, first communication circuits 304 can decode received data according to an FEC algorithm assumed to be running on a target device. A W/O FEC mode 316-0 does not include such encoding.

A status section 304-1 can generate status values representing a state of first communication circuits 304. Such status information can include, as but two of many possible examples, an operating mode of the first communication circuits 304 (i.e., W/O FEC or W/FEC) and/or if first communication circuits 304 are currently receiving in the W/FEC mode (or when first communication circuits 304 are scheduled to receive in such a mode).

First radio circuits 308-0 can receive (and transmit) data according the first standard, which can include modes W/O FEC 316-0 and W/FEC 316-1.

Second communication circuits 306 can be wireless communication circuits compatible with a second standard. The second standard can share a transmission medium with the first standard. Second communication circuits 306 can include a power control section 306-0 which can vary transmission power in response to status information from status section 304-1. In some embodiments, power control section 306-0 can switch from a lower transmission power to a higher transmission power when status information indicates first communication circuits 304 operating in and/or currently receiving in the W/FEC mode. Power control section 306-0 can then dynamically return to the lower transmission power when status information indicates first communication circuits 304 no longer operating in and/or currently receiving in the W/FEC mode.

Second radio circuits 308-1 can transmit data according the second standard. Such a transmission can be at a higher or lower transmission power based on power control section 306-0.

In some embodiments, a combination device 302 can be a single integrated circuit device. In some embodiments, first and second communication circuits (302 and 304) can be formed in a same integrated circuit substrate.

Figure 4:
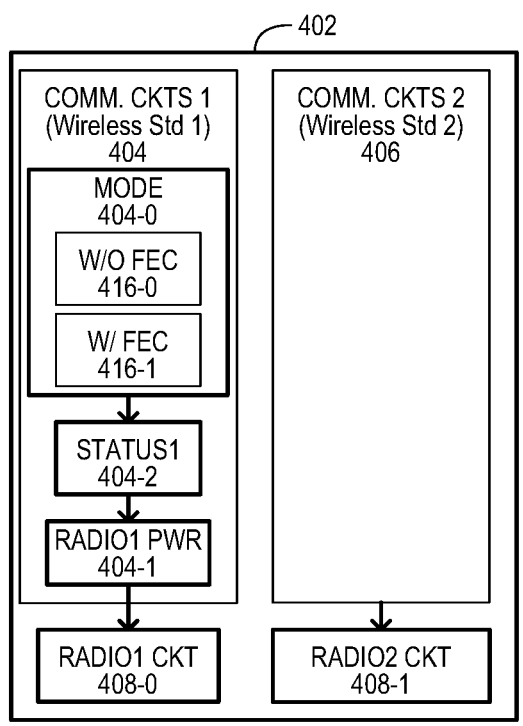
FIG. 4 is a block diagram of a combination device according to another embodiment.

FIG. 4 is a block diagram 402 of a combination device 402 according to another embodiment. A device 402 can include different communication circuits collocated in the same device, including first communication circuits 404, second communication circuits 406, first radio circuits 408-0, and second radio circuits 408-1.

First communication circuits 404 can include sections like those shown in FIG. 3, and so a description of such sections will not be repeated. Unlike FIG. 3, first communication circuits 404 also include a power control section 404-1 that can switch a reception power (e.g., reception power limit) of first radio circuits 408-0 between two different levels. In some embodiments, power control section 404-[0]1 can switch to a lower reception power when status information indicates first communication circuits 404 are switching to the W/FEC mode.

First radio circuits 408-0 can transmit data according the first standard, including in mode W/O FEC 416-0 or mode W/FEC 416-1. Further, based on power control section 404-0, receptions in mode W/FEC 416-1 can be at a lower power level than transmissions in mode W/O FEC 416-0.

Second communication circuits 406 can be wireless communication circuits compatible with a second standard. The second standard can share a transmission medium with the first standard. Second communication circuits 406 may or may not include sections like those of 306 shown in FIG. 3.

In some embodiments, a combination device 402 can be a single integrated circuit device. In some embodiments, first and second communication circuits (402 and 404) can be formed in a same integrated circuit substrate.

Figure 5:
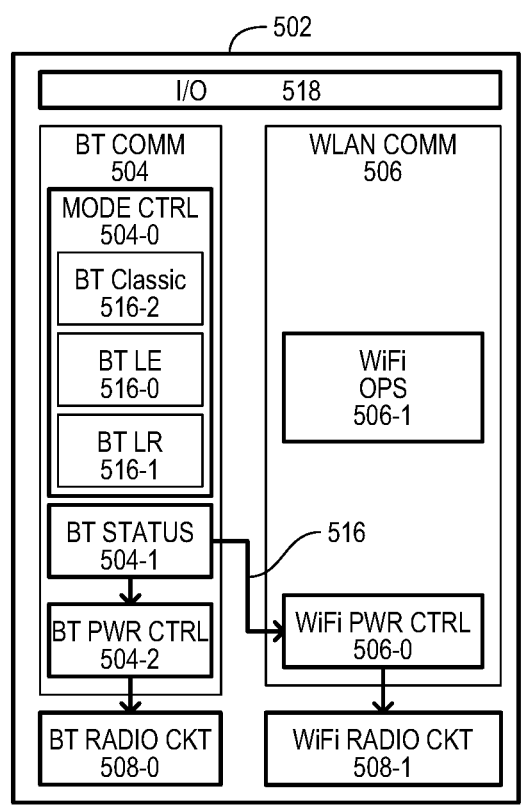
FIG. 5 is a block diagram of a BT-WiFi combination device according to an embodiment.

Embodiments can include combination device with collocated communication circuits of any suitable type. However, in some embodiments a combination device can have communication circuits that frequency hops between first channels, collocated with other communication circuits the transmit across a second channel that overlaps multiple first channels. FIG. 5 shows an example of such an embodiment.

FIG. 5 is a block diagram of a combination device 502 according to another embodiment. In some embodiments, device 502 can be one implementation of either of those shown in FIG. 3 or 4. A combination device 502 can include BT communication circuits 504, WiFi communication circuits 506, BT radio circuits 508-0, WiFi radio circuits 508-1, and input/output (I/O) circuits 518.

BT communication circuits 504 can be circuits compatible with a BT standard, and can include a BT mode control section 504-0, a BT status section 504-1, and BT power control section 504-2. A BT mode control section 504-0 can include circuits that enable BT communication circuits 504 to operate in a BT "classic" mode 516-2 (i.e., 80 1 MHz channels), BT LE mode 516-0 (40 2 MHz channels with no FEC coding), and a BT LR mode 516-1 (40 2 MHz channels with S=2 or S=8 FEC encoding).

A BT status section 504-1 can store information indicating a status of the BT communication circuits 504-0. According to embodiments, such status information can include, but is not limited to, any of: a current mode of operation (e.g., BT Classic, BT LE, BT LR), BT transmission status (e.g., transmitting, or a time indication as when BT transmissions are to occur), a BT LE mode, information for a current BT link, or an indication that WiFi communication circuits 506 can transmit at a higher power level. Status information can be transmitted to WiFi communication circuits 506 and/or can be accessed by the same.

A BT power control section 504-2 can vary a BT reception power limits based on BT status information from BT status section 504-1. In some embodiments, BT power transmission level can be varied based on a type of BT LR link. In some embodiments, if a BT LR link has a predetermined level of quality, BT transmission power can be reduced for such a link. In some embodiments, a quality of the link can be determined based on error data. Error data can be generated in any suitable manner, and in some embodiments can include a packet error rate and/or results of checking CRC values. Error data for a link can be generated by the combination device 502, the other BT device of the link, or a combination of both.

BT radio circuits 508-0 can include circuits for transmitting on at least the 2.4 GHz band according to a BT standard, including BT Classic, BT LE and BT LR. BT radio circuits 508-0 can also vary a transmission power according to BT power control section 504-2.

WiFi communication circuits 506 can include a WiFi operations section 506-1 and a WiFi power control section 506-0. A WiFi operations section 506-1 can include circuits that enable WiFi communication circuits 506 to operate according to one or more IEEE 802.11 wireless standards for the 2.4 GHz ISM band.

A WiFi power control section 506-0 can vary a WiFi transmission power based on BT status information 516 from BT status section 504-1. In some embodiments, WiFi power can be varied based on a type of BT link. In some embodiments, if a BT LR link is active, WiFi transmission power can be increased. Once BT communication circuits 504 switch to a different type of link (e.g., switch to a BT Classic or BT LE link), WiFi power can be reduced. In some embodiments, WiFi transmission power can be increased only if a BT LR link is of sufficient quality. In some embodiments, a quality of the BT LR link can be determined as described for BT power control section 504-2.

WiFi radio circuits 508-1 can include circuits for transmitting on at least the 2.4 GHz band according to one or more IEEE 802.11 standards. WiFi radio circuits 508-1 can adjust a power transmission level based on WiFi power control section 506-0.

I/O circuits 518 can enable control of combination device 502 from sources external to the combination device 502. I/O circuits 518 can enable communication with the combination device 502 according to any suitable method, including but not limited to: serial digital interface (SDI), universal serial bus (USB), universal asynchronous receiver transmitter (UART), I²C, or I²S.

Figure 6:
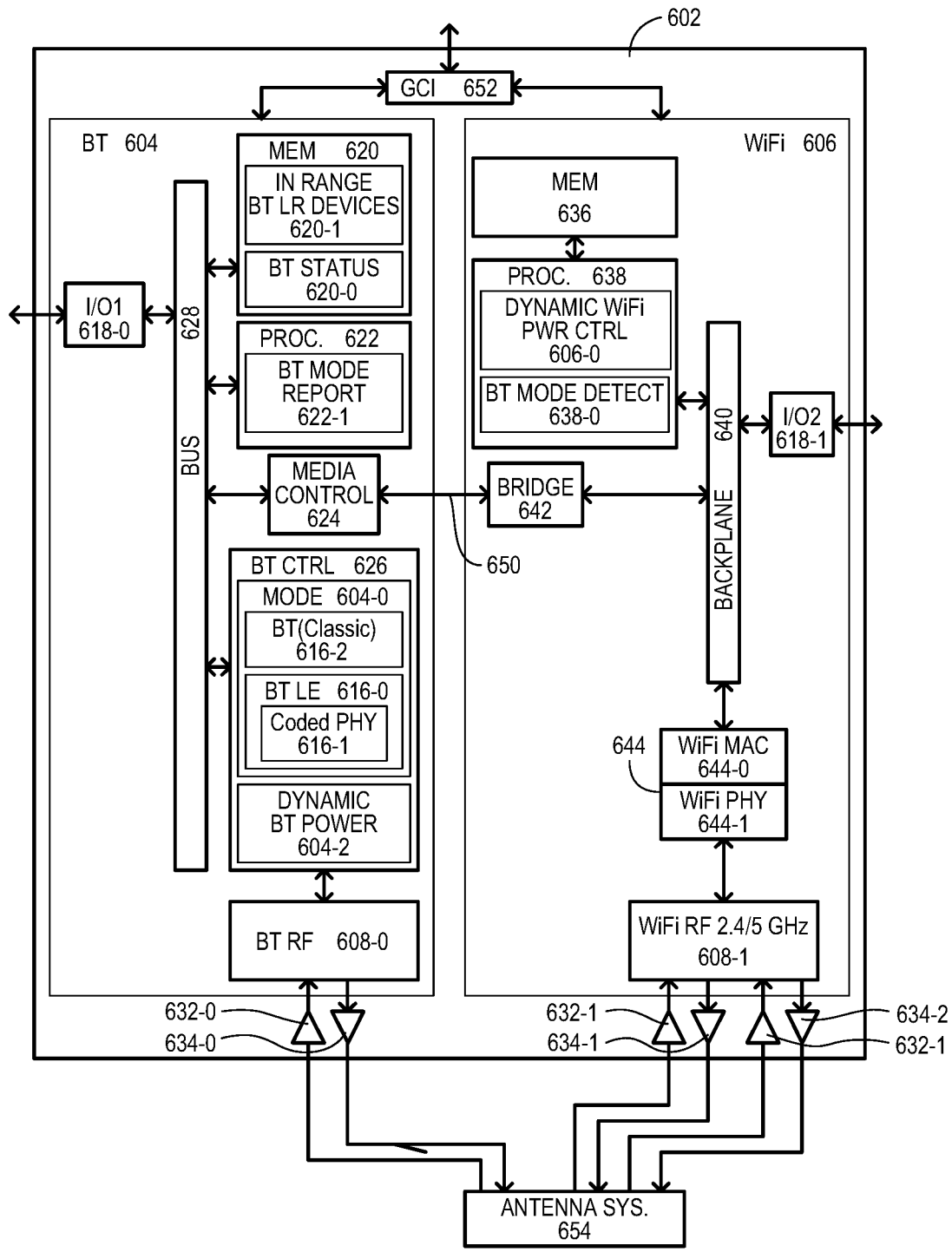
FIG. 6 is a block diagram of a BT-WiFi combination device according to another embodiment.

FIG. 6 is a block diagram of a combination device 602 according to another embodiment. In some embodiments, combination device 602 can be an implementation of any of those shown in FIGS. 3 to 5. A combination device 602 can include a BT section 604 and a WiFi section 606. A BT section 604 can include a processor section 622, a memory section 620, BT control circuits 626, media control circuits 624, first I/O circuits 618-0, and BT RF circuits 608-0.

A processor section 622 can execute instructions for BT operations, including a BT mode reporting function 622-1 that can generate BT status information as described herein or equivalents. A memory section 620 can store data for BT operations, including the BT status information 620-0. In some embodiments, a memory section 620 can also store identifying information for any BT devices having a high-quality BT LR link (referred to as "in range" BT LR devices) 620-1. An "in range" BT LR device can be a device that connects to the combination device 602 with a BT LR link that is of sufficient quality, that WiFi transmissions at a higher power do not affect the BT LR link. In some embodiments, BT mode reporting function 622-1 can transmit BT status information 620-0 to WiFi section 606.

BT control circuits 626 can include circuits for performing functions according to one or more BT standards, and can include a mode control section 604-0 and dynamic BT power section 604-2. Mode control section 604-0 can include circuits for operating BT section 604 in a BT classic mode 616-2 and BT low energy modes 616-0, including a BT LE mode, as well as a BT LR mode (shown as coded PHY) 616-1. Dynamic BT power section 604-2 can generate reception power limits for BT RF circuits 608-0 based on a BT mode of operation. In some embodiments, dynamic BT power section 604-2 can access BT status information 620-0 or the "in range" BT LR device information 620-1. As a BT section 604 switches between different modes of operation, dynamic power control section 604-2 can vary a reception power limit for BT RF circuits 608-0.

BT RF circuits 608-0 can be controlled by BT control circuits 626 and can include radio circuits to enable transmission of packets according to one or more BT standards. In the embodiment shown, BT RF circuits 608-0 can drive one or more BT power amplifiers (PA) 634-0 and receive input signals from a BT low noise amplifier (LNA) 632-0. BT PA(s) 634-0 can operate at two or more different power levels, with the power levels being determined by dynamic BT power control circuits 604-2.

Media control circuits 624 can communicate with WiFi section 606 over bridge 650 to control access to a transmission media (e.g., 2.4 GHz band). First I/O circuits 618-0 can enable communication with the combination device 602 according to any of the embodiments described herein or equivalents.

Processor section 622, memory section 620, BT control circuits 626, media control circuit 624, and first I/O circuits 618-0 can communicate with one another over a bus 628.

A WiFi section 606 can include a processor section 638, a memory section 636, second I/O circuits 618-1, IEEE 802.11 circuits 644, bridge control circuit 642, and WiFi radio circuits 6484 608-1. A processor section 638 can execute instructions for WiFi operations, including dynamically controlling a power of WiFi transmissions 606-0 and detecting a BT mode of operation 638-0. A BT mode detect function 638-0 can determine a mode of operation for BT section 604. In some embodiments, this can include accessing or receiving BT status information 620-0. Dynamic WiFi power control section 606-0 can generate a transmission power indication for WiFi RF circuits 608-1 based on a BT mode of operation.

Second I/O circuits 618-1 can enable communication with the combination device 602 according to any of the embodiments described herein or equivalents, including communications with a BT section 604 over bridge 650. Bridge control circuit 642 can control communications between BT section 604 and WiFi section 606 over bridge 650.

IEEE 802.11 circuits 644 can include circuits for performing functions according to one or more IEEE 802.11 wireless standards, including those operating in the 2.4 and 5 GHz band. In some embodiments, this can include IEEE 802.11 compatible media access control (MAC) layer circuits 644-0 and IEEE 802.11 compatible physical interface layer (PHY) circuits 644-1.

WiFi RF circuits 608-1 can include multi-band radio circuits that transmit and receive data on one or more WiFi bands (e.g., 2.4 GHz, 5 GHz). In the embodiment shown, WiFi RF circuits 608-1 can drive one or more 2.4 GHz band PA(s) 634-1, a 5 GHz band PA 634-2-5, and receive input signals from a 2.4 GHz LNA 632-1-2 and a 5 GHz LNA 632-2. PA(s) 634-1 for the 2.4 GHz band are capable of transmitting at a lower and higher power level, based on dynamic WiFi power control 606-0.

A combination device 602 can also include a global coexistence interface (GCI) 652 connected to both the BT section 604 and WiFi section 606. In some embodiments, GCI 652 can enable a combination device to interface with other wireless systems, such as cellular network systems, including but not limited to 3G, 4G, LTE and 5G networks.

Processor section 622, bridge control circuit 434, and IEEE 802.11 circuits 444 can be connected to one another over a backplane 640.

A combination device 602 can connect to an antenna system 654. Antenna system 654 can include one or more physical antennas, as well as switches for enabling different connections to such antennas.

Figure 7:
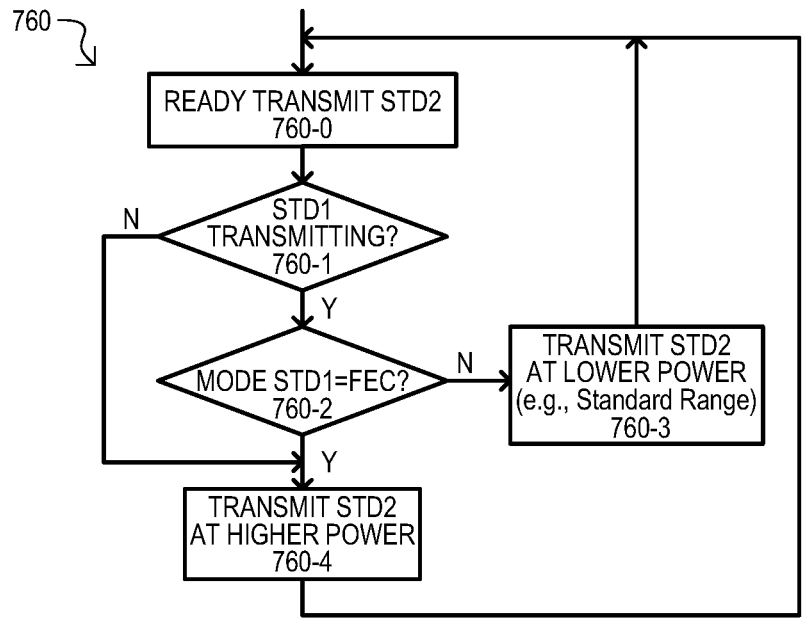
FIG. 7 is a flow diagram of a method for dynamically varying transmit power of one wireless circuit in response to the mode of another wireless circuit according to an embodiment.

While the described systems and devices have disclosed various methods according to embodiments, additional methods will be described with reference to a number of flow diagrams. FIG. 7 is a flow diagram of a method 760 according to an embodiment. In some embodiments, a method 760 is executable by a combination device, such as those described herein, or equivalents.

A method 760 can include determining that a transmission according to a second standard (STD2) is ready to be executed 760-0. Such an action can include a device receiving a payload for wireless transmission according to the second standard and ensuring a transmission medium is available for the transmission. In some embodiments, this can include following a contention-based protocol (e.g., carrier sense multiple access with collision detection).

A method 760 can include determining if transmissions according to a first standard (STD1) are occurring 760-1. If transmissions according to the first standard are occurring (Y from 760-1), a method 760 can determine if the first standard transmissions are according to a mode that includes FEC 760-2. If the first standard mode includes FEC (Y from 760-2) or transmission according to the first standard are not taking place (N from 760-1), a method 760 can transmit according to the second standard at a higher power level 760-4. A method 760 can then return to 760-0.

If the mode according to the first standard does not include FEC (N from 760-2), a method 760 can transmit according to the second standard at a lower power level 760-3. A method 760 can then return to 760-0.

Figure 8:
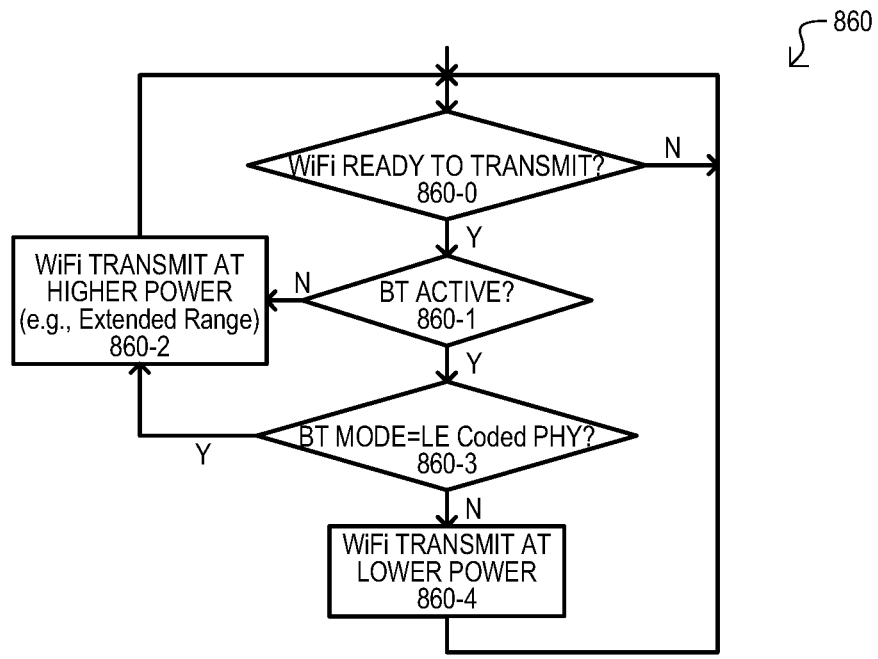
FIG. 8 is a flow diagram of a method for dynamically varying WiFi transmit power according to BT operations according to an embodiment.

FIG. 8 is a flow diagram of a method 860 according to another embodiment. In some embodiments, a method 860 can be executed by WiFi circuits of a BT-WiFi combination device, such as those described herein, or equivalents.

A method 860 can include determining if a WiFi transmission is to take place 860-0. Such an action can include a combination device receiving payload data and forming one or more data units (e.g., PPDU) for transmission according to an IEEE 802.11 standard in the 2.4 GHz band. If a WiFi transmission is not to take place (N from 860-0), a method 860 can return to waiting for a WiFi transmission to take place (860-0).

If a WiFi transmission is to take place (Y from 860-0), a method 860 can determine if BT transmission are active 860-1. Such an action can include WiFi circuits accessing or receiving BT status information as described herein, or equivalents. If BT transmissions are active (Y from 860-1), a method 860 can include determining if BT circuits are operating in the BT LR mode 860-3.

If BT circuits are operating in the BT LR mode (Y from 860-3) or BT circuits are not active (N from 860-1), WiFi circuits can transmit at a higher power level 860-2. In some embodiments, this can be a WiFi extended range mode. A method 860 can then return to 860-0.

If BT circuits are not operating in the BT LR mode (N from 860-3) WiFi circuits can transmit at a lower power level 860-4. A method 860 can then return to 860-0.

Figure 9:
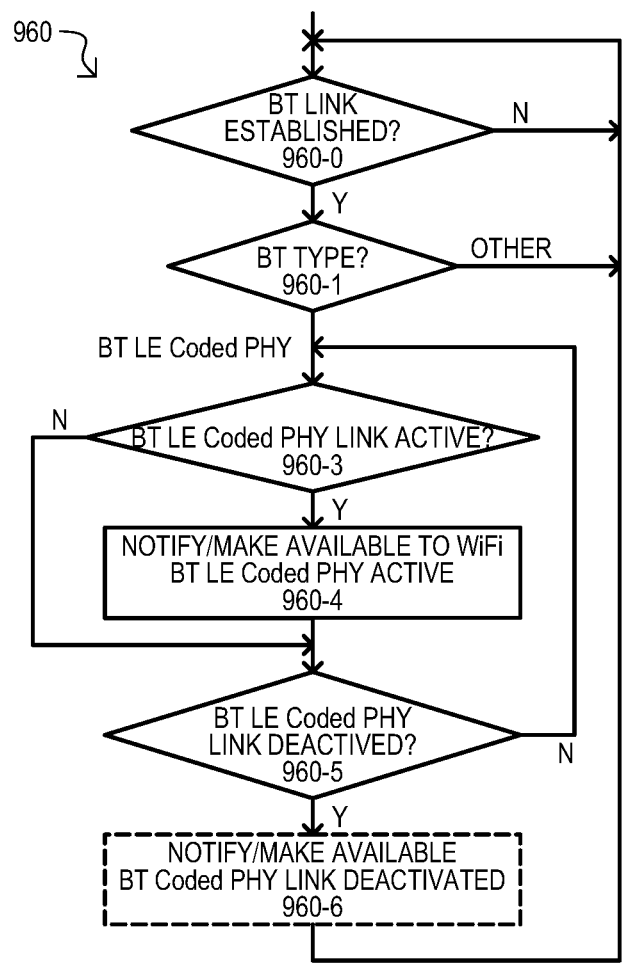
FIG. 9 is a flow diagram of a method for notifying WiFi circuits of BT Long Range (LR) operations according to an embodiment.

FIG. 9 is a flow diagram of a method 960 according to another embodiment. In some embodiments, a method 960 can be executed by BT circuits of a BT-WiFi combination device, such as those described herein, or equivalents.

A method 960 can include determining if a BT link has been established 960-0. Such an action can include a combination device advertising for links to other BT devices and then responding to a connection request, or a combination device responding to such an advertisement from another BT device. If a BT link is not established, a method 960 can continue to wait for a BT link (960-0).

If a BT link is established (Y from 960-0), a method 960 can determine type of link 960-1. Such an action can include BT circuits following BT protocols, including the exchanging of control protocol data units. If a link is not a BT LR link (OTHER from 960-1), a method 960 can return to 960-0.

If a link is a BT LR link (BT LE Coded PHY from 960-1), a method 960 can determine if the link is active 960-3. Such an action an include simply determining the link continues to exist. However, in other embodiment, such an action can include determining if such transmissions are occurring on the link and/or determining when such transmissions are to occur. If the BT LR link is active (Y from 960-3), a method 960 can notify WiFi circuits of the status and/or make such information available to WiFi circuits 960-4. In some embodiments, this can include transmitting a signal or data to WiFi circuits over a bus or the like. In addition or alternatively, this can include storing such an indication for access by WiFi circuits.

After notifying WiFi circuits of the status of a BT LR link and/or make such information available to WiFi, or if the BT LR link is not active (N from 960-3), a method 960 can determine if the BT LR link is deactivated 960-5. If the BT LR link is not deactivated (N from 960-5) a method 960 can return to 960-3. If the BT LR link is deactivated (Y from 960-5) a method 960 can return to 960-0. Optionally, a method 960 can notify WiFi circuits that the BT LR link is deactivated 960-6.

Figure 10:
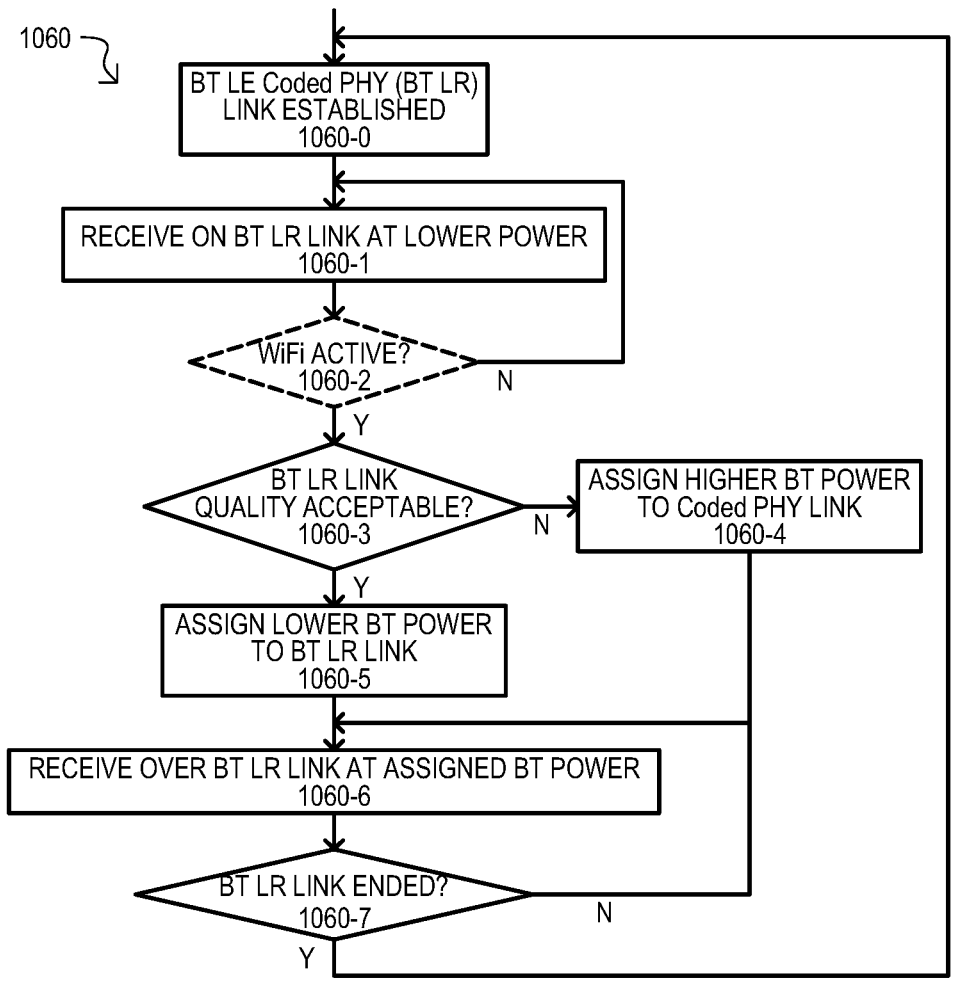
FIG. 10 is a flow diagram of a method for assigning different BT transmission power levels in a BT-WiFi combination device, according to an embodiment.

FIG. 10 is a flow diagram of a method 1060 according to another embodiment. In some embodiments, a method 1060 can be executed by BT circuits of a BT-WiFi combination device such as those described herein, or equivalents.

A method 1060 can test a quality of a BT LR link, and assign a lower BT reception power level limit to the link if it is of sufficient quality. A method 960 can include the establishment of a BT LR link 1060-0. A method 1060 can then receive at a lower power level limit on the link 1060-1. With BT receptions occurring at the lower power level limit, a method 1060 can determine a quality of the link 1060-3. Such an action can include determining BT link quality according to any suitable method, including but not limited to monitoring a PER of the link, or CRC codes of packets transmitted over the link. Optionally, a quality determination 1060-3 can be made while WiFi circuits are active 1060-2. A quality level can vary according to application. As but one example, an application may have a minimum data throughput rate.

If the BT LR link is not of sufficient quality (N from 1060-3), a higher BT reception power limit can be assigned to the link 1060-4. If the BT LR link is of sufficient quality (Y from 1060-3), a lower BT reception power limit can be assigned to the link 1060-6. A method 1060 can then receive over the BT LR link at the assigned power level limit 1060-6. In the case of the lower power level limit, such an action can provide a better environment for operations of collocated WiFi circuits. In addition, there can be greater power savings.

A method 1060 can determine if the BT LR link has ended 1060-7. If the BT LR link has not ended (N from 1060-7), a method 1060 can continue to receive over the link at the assigned power level limit. If the BT LR link has ended (Y from 1060-7), a method 1060 can return to 1060-0.

Figure 11:
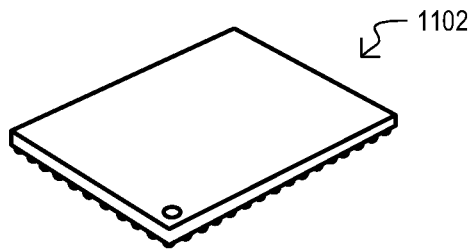
FIG. 11 is a diagram of a combination device according to an embodiment.

While embodiments can take any suitable form, some embodiments can be advantageously compact single integrated circuits (i.e., chips). FIG. 11 shows a packaged single chip combination device 1102 according such an embodiment. However, it is understood that a combination device can include any other suitable integrated circuit packaging type, as well as direct bonding of a combination device chip onto a circuit board or substrate. A combination device 1102 can include first and second communication circuits that can share a band. One of the communication circuits can alter the power of transmissions based on whether a connection is more robust due to a coding method for the data (e.g., redundancy, including FEC).

Figure 12:
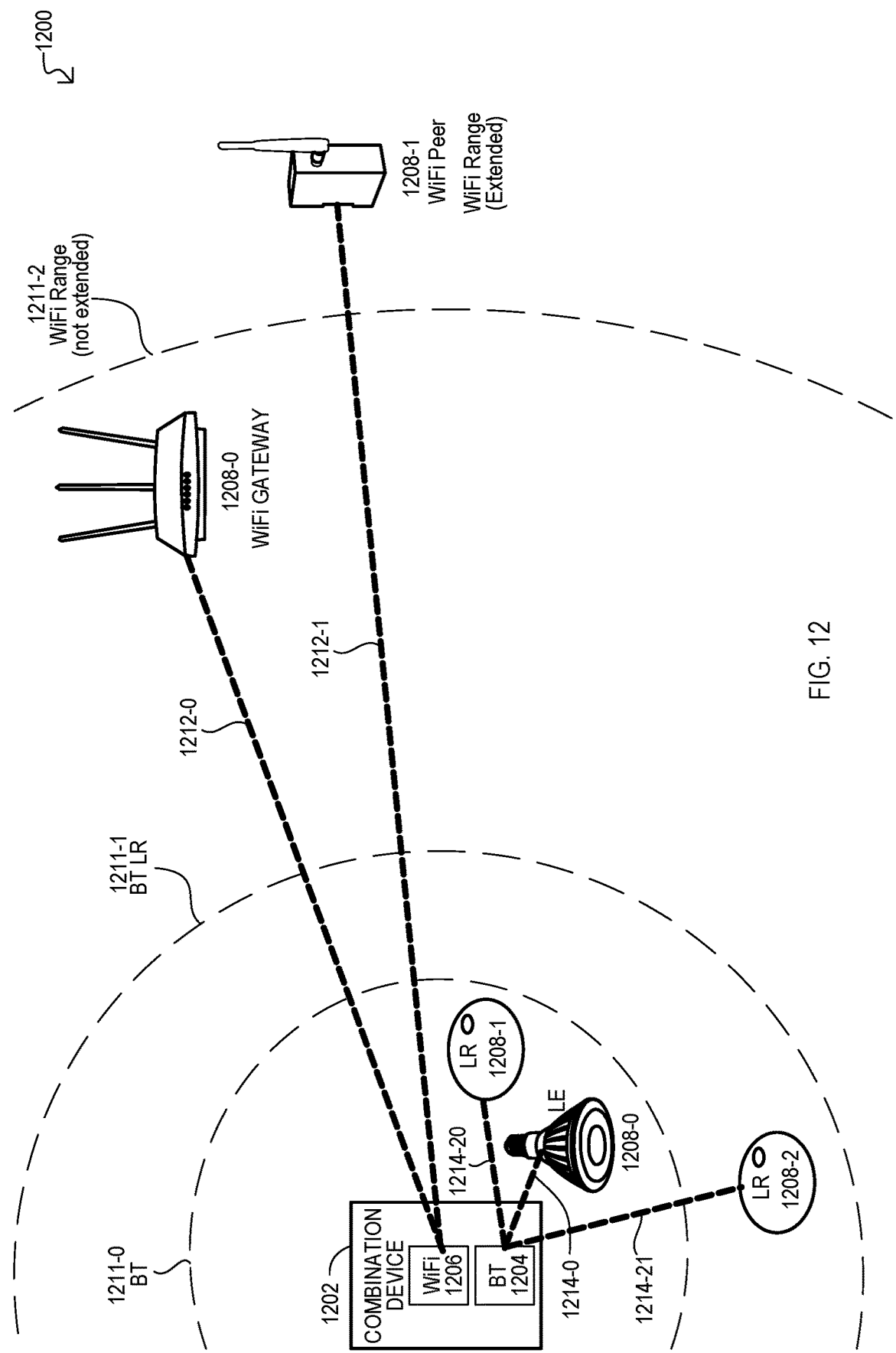
FIG. 12 is a diagram of an Internet-of-Things (IoT) system according to an embodiment.

While embodiments can include systems of any suitable application, a system according to one embodiment will now be described in detail. FIG. 12 shows an Internet-of-Things (IoT) type system 1200 according to an embodiment. A system 1200 can include a BT-WiFi combination device 1202, various other IoT devices 1208-0 to -2 and 1210-0/1. Combination device 1202 can include a BT circuits 1204 and WiFi circuits 1206 as described herein, or equivalents.

IoT device 1208-0 can be configured for a BT LE connection 1214-0 with BT circuits 1204. IoT devices 1208-1/2 can be configured for BT LR connections 1214-20 and 1214-21 respectively, with BT circuits 1204. IoT devices 1208-0/1 can be within a standard BT range 1211-0 for the system/environment, while IoT device 1208-2 can be at an extended BT range 1211-1. The extended range 1211-1 can be achieved using a BT LR connection, and not a BT classic or BT LE connection.

IoT devices 1210-0/1 can be configured for WiFi connections 1212-0/1 respectively, with WiFi circuits 1206. IoT device 1210-0 can be within a standard WiFi range 1211-2, and in the embodiment shown, can be a gateway device for accessing a server or the like. IoT device 1210-1 can be beyond the standard WiFi range 1211-2, and so can be reached by WiFi circuits 1206 transmitting at an increased power level.

According to embodiments, a transmission power of WiFi circuits 1206 and/or reception power of BT circuits 1204 can be dynamically changed according to the type of BT link.

In the case of dynamic WiFi transmission power, while BT circuits 1204 are communicating via BT LE link 1214-0 or BT LR (extended range) link 1214-21, WiFi circuits 1206 can transmit at a lower power, and so may not reach IoT device 1208-1. However, once BT circuits 1204 switch to "in range" BT LR link 1214-20, WiFi circuits 1206 can transmit at a higher power, and thus reliably reach extended range IoT device 1208-1. Once BT circuits 1204 return to the BT LE link 1214-0 or BT LR (extended range) link 1214-21, WiFi circuits 1206 can return to the lower transmission power.

In the case of dynamic BT reception power, while BT circuits 1204 are communicating via BT LE link 1214-0 or BT LR (extended range) link 1214-21, BT reception can occur at a higher power. However, once BT circuits 1204 switch to "in range" BT LR link 1214-20, BT circuits 1204 can receive at a lower power, as the coding (e.g., FEC) can ensure a reliable link.

Embodiments described herein are in contrast to conventional approaches, in which transmission power of WiFi circuits is limited to ensure non-interference with collocated BT circuits. This can result increased data throughput for both WiFi and BT circuits, as well as greater range devices. Embodiments described herein are also in contrast to conventional approaches, in which transmission power of BT circuits remains constant over all connection types (e.g., BT classic, BT LE, BT LR), and thus can consume less power.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
   in an integrated circuit device having first communication circuits and second communication circuits
   determining if the first communication circuits are operating
     in a first mode that wirelessly receives data at a first rate, or
     a second mode that wirelessly receives data at a second rate that is slower than the first rate; and
   if the first communication circuits are operating in the second mode and not the first mode, transmitting signals with the second communication circuits at a first power level, and
   if the first communication circuits are operating in the first mode, transmitting signals with the second communication circuits at a second power level that is lower than the first power level.

2. The method of claim 1, wherein:
   the first mode is compatible with the Bluetooth Low Energy (LE) standard; and
   the second mode is compatible with the Bluetooth Low Energy Long Range (coded PHY) standard.

3. The method of claim 1, wherein:
   the second communication circuits are compatible with at least one IEEE 802.11 wireless standard.

4. The method of claim 1, further including:
   if the first communication circuits are operating in the first mode, transmitting signals to the first communication circuits at a third power level; and
   if the first communication circuits are operating in the second mode, transmitting signals to the first communication circuits at a fourth power level that is less than the third power level.

5. The method of claim 1, wherein:
   determining if the first communication circuits are operating in the first mode or the second mode includes exchanging data units with another device to establish a link according to the first mode or the second mode.

6. The method of claim 1, further including:
   determining a quality of first channels; and
   excluding first channels having a quality below a predetermined threshold from the selected first channels.

7. The method of claim 1, wherein:
   in the first mode, data are not encoded for a forward error correction algorithm by a receiving device; and
   in the second mode, data are encoded for a forward error correction algorithm by a receiving device.

8. The method of claim 1, wherein:
   the first communication circuits frequency hop between selected first channels, and the second communication circuits transmit across at least one second channel that overlaps a plurality of the selected first channels.

\* \* \* \* \*